Aug. 3, 1965 F. C. SEIDEN 3,198,450

TAPE CARTRIDGE

Filed Feb. 28, 1962

INVENTOR.

FREDERICK C. SEIDEN

BY

ATTORNEY 3,198,450
Patented Aug. 3, 1965

3,198,450
TAPE CARTRIDGE

Frederick C. Seiden, Lynbrook, N.Y., assignor to Potter Instrument Company, Inc., Plainview, N.Y., a corporation of New York Filed Feb. 28, 1962, Ser. No. 176,325
7 Claims. (Cl. 242—55.13)

This invention, generally, relates to tape handling equipment, and more particularly, to a tape cartridge for containing an information-bearing tape separate from information processing apparatus.

Present day handling of tape reels for both magnetic and perforated tape require the reels to be mounted separately and the tape to be threaded from one reel through various tension arm rollers and other guide rollers to be attached, finally, to the other reel. In other words, the reels have been handled separately, and the tape itself is handled resulting in collection of dust particles and other contaminants.

A principal object of the present invention is to provide a tape cartridge for containing an information-bearing tape on one reel with one end already attached to a second reel.

Another object of the invention is to provide a new and improved device for supporting tape in a predetermined manner for cooperation with information processing apparatus.

Still another object of the invention is to provide a tape cartridge including means to maintain at least a portion of the tape in a consistent, predetermined position.

Briefly, the invention provides a tape cartridge having a base adapted to journal two tape reels rotatably in a predetermined spacial relationship. Tape guide means are supported on the base to direct the tape in a predetermined path between the two reels such that the tape is threaded automatically relative to rollers on information processing apparatus when the tape cartridge is mounted thereon.

Other objects and advantages of the invention will become apparent from the following detailed description of a preferred form of the invention taken in conjunction with the accompanying drawings, in which.

Figures 1, 2, 3:
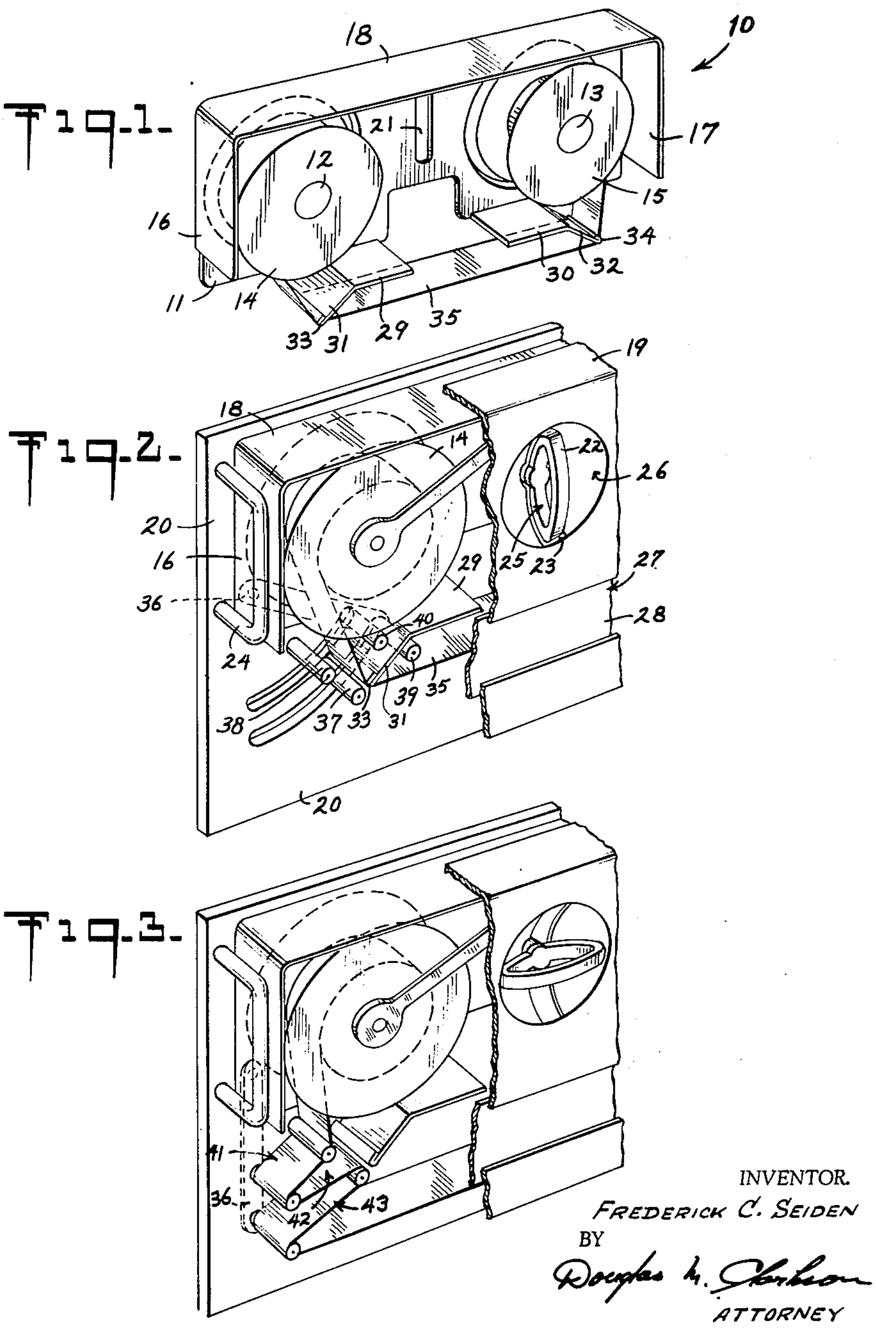
FIG. 1 is a view in perspective of a tape cartridge in accordance with the principles of the invention.
FIG. 2 is a view of the cartridge shown in FIG. 1 after mounting on information processing apparatus.
FIG. 3 is a view similar to FIG. 2 after the tension arms on the information processing apparatus are released to form loops in the tape.

Referring now to the drawings in detail, the tape cartridge is identified generally by the numeral 10 and includes a base 11 for journaling two shafts 12 and 13 in a spaced apart relationship relative to each other. The shafts 12 and 13 are adapted to support tape reels 14 and 15, respectively.

While any suitable enclosure may be provided for the tape cartridge 10, the form shown in the drawings includes end flanges 16 and 17 with a top flange 18. The bottom and front of the tape cartridge 10 remain open, but become closed upon the positioning of a cover 19, which will be described in greater detail presently.

The tape cartridge 10 is mountable on a panel 20 of information processing apparatus by the provision of a slot 21 which permits a handle 22 to pass therethrough and also through a slot 23 in the cover 19. It may be seen now that by turning the handle 22 approximately 90°, the cover 19 and the tape cartridge 10 become fixedly mounted to the panel 20. A loop 24 is mounted on the panel 20 at each end of the tape cartridge 10 to cooperate with the two end flanges 16 and 17 for restraining the tape cartridge 10 in the position shown.

While the handle 22 may assume any desired configuration to obtain a particular aesthetic appeal, the particular form of the handle 22 shown is uniquely adapted with a central opening 25 for receiving the index finger of an operator for positive rotation of the handle 22. In addition, the front surface of the cover 19 is provided with a hemispheric recess 26 about the slot 23 for cooperating with the periphery of the handle 22 while mounting and permitting ready access to the aperture 25 yet mounting the handle 22 in a recessed, protective position relative to the front surface cover 19.

An elongated slot 27 is formed in the front cover 19, and while any suitable transparent material may be positioned over this slot 27 to permit observation of the tape inside, a metal strip 28 is shown in the drawing for sealing the slot 27.

The tape positioning means of the tape cartridge 10 in the preferred form of the invention takes the form of two flanges 29 and 30 formed on the base 11 in substantially parallel relationship with the top 18. While the flanges 29 and 30 may be formed integrally with the material of the base 11, they also may be formed separately and attached by suitable means, such as welding.

A portion of each flange 29 and 30, for example the portions 31 and 32 furthermost from each other, are bent downwardly and away from each other at a slight angle of approximately 30° or 45° to extend beyond the bottom edge of the base 11, and the ends 33 and 34 are turned back to provide a smooth, rounded surface against which a tape 35 may rest.

Before mounting the tape cartridge 10 on a panel 20 of a suitable information processing apparatus, the multiple loop tension arms (only tension arm 36 is visible) are retracted. When the tape cartridge 10 is mounted, it will be noted that the end 33 is supporting the tape 35 in a position between the fixed rollers 37–38 and the rollers 39–40 on the tension arm 36. Actually, in the form shown, the flange portion 31 extends between the two rollers 39 and 40 on the tension arm 36.

Now, it may be seen that when the tension arm 36 is released from its retracted position, the tape 35 becomes threaded automatically into the loops indicated generally by the numerals 41, 42 and 43. While not visible in the drawings, the opposite end of the panel 20 is provided with a tension arm and rollers similar to those identified by the numerals 36–40.

Any suitable mechanism may be used to retract and then release the tension arms. For example, suitable connections may be made between the tension arms and the shaft of the handle 22, so that the tension arms are retracted automatically when the handle 22 is turned to a position for removing the tape cartridge 10 and released automatically when the handle 22 is turned to lock the tape cartridge 10 in place.

When the tape is developed into the loops 41, 42 and 43 on each side of the tape cartridge 10, that portion of the tape between the roller 39 and the corresponding roller at the opposite end of the tape cartridge 10 (not visible) becomes positioned automatically relative to a magnetic transducer head (not shown) with the ability to read or write or both read and write information on the tape 35.

With an arrangement in accordance with the invention, the tape cartridge 10 permits greater ease in loading tape since it eliminates the need to handle the tape itself. Also, the automatic positioning of the tape by the rollers 39 permit accurate placement of the tape relative a transducer head (not shown).

An important advantage of a tape cartridge in accordance with the invention is that it permits automatic loading and unloading of tape without the necessity of winding the tape up completely on either reel. Thus, the tape may be removed promptly at any time after use whether the end of the tape has been reached or not.

Obviously many modifications and variations may be made in view of the preceding description. Therefore, it is intended that the scope of the invention be defined by the appended claims.

What is claimed is:

1. In an information processing system having a tape transport with means to mount two tape reels, a first set of fixed tension rollers, and a second set of tension rollers movable between a first position on one side of said first tension rollers and a second position on the other side of said first tension rollers, said tension rollers passing interstitially when said first set of tension rollers is moved between said first and second positions;

a tape cartridge for containing information-bearing tape separate from said tape transport, comprising a base, including means to journal two tape reels rotatably in a predetermined spatial relationship to be mounted on said mounting means of said tape transport, tape positioning means to direct tape along a predetermined path between the two reels and positioning said predetermined path to be between said first position of said second tension rollers and said first tension rollers when said cartridge is mounted on said tape transport, so that after said cartridge has been mounted on said tape transport said second set of tension rollers may be moved from said first position to said second position to properly tension the tape and move the tape out of engagement with said positioning means, said tape positioning means extending beyond the bottom edge of said base to permit said tension rollers to be inserted adjacent to the tape and to permit said second set of tension rollers to be moved from said first position to said second position.

2. A tape cartridge in an information processing system as set forth in claim 1 wherein said tape positioning means is a passive, non-moving member supported by said base.

3. A tape cartridge in an information processing system as set forth in claim 1 wherein said tape positioning means includes a fixed flange supported by said base at a predetermined angle.

4. A tape cartridge in an information processing system as set forth in claim 1 wherein said tape positioning means includes at least two passive members supported by said base in a predetermined position.

5. A tape cartridge in an information processing system as set forth in claim 1 wherein said tape positioning means includes a first tape guide member supported on said base, and a second tape guide member supported on said base in a spaced apart relationship with said first guide member.

6. A tape cartridge in an information processing system as set forth in claim 1 wherein said tape positioning means includes at least two flange portions extending from said base downwardly in a direction opposite from each other, and the outermost edges of each flange portion being rounded to provide smooth support for a tape.

7. A tape cartridge in an information processing system as set forth in claim 1 wherein said tape positioning means includes means adapted to maintain at least a portion of the tape in a consistent, predetermined position regardless of the amount of tape on the respective tape reels, and to maintain the tape portion in said position only when said cartridge is unmounted on information processing apparatus.

References Cited by the Examiner

UNITED STATES PATENTS

| | | | |
|---|---|---|---|
| 2,941,741 | 6/60 | Bilsback | 242—55.13 |
| 3,008,661 | 11/61 | Estes et al. | 242—55.13 |

MERVIN STEIN, *Primary Examiner.*

HARRISON R. MOSELEY, *Examiner.*